United States Patent
Johnson et al.

(12)

(10) Patent No.: US 6,418,714 B1
(45) Date of Patent: Jul. 16, 2002

(54) ACCUMULATOR UTILIZING HOUSING CASE PRESSURE

(75) Inventors: Andrew T. Johnson, Scottsdale; Todd Langston, Chandler; Daniel Navarro, Tempe, all of AZ (US)

(73) Assignee: Honeywell International, Inc., Morristown, NJ (US)

( * ) Notice: Subject to any disclaimer, the term of this patent is extended or adjusted under 35 U.S.C. 154(b) by 50 days.

(21) Appl. No.: 09/644,375

(22) Filed: Aug. 23, 2000

Related U.S. Application Data

(63) Continuation-in-part of application No. 09/482,212, filed on Jan. 12, 2000.
(60) Provisional application No. 60/161,157, filed on Oct. 22, 1999.

(51) Int. Cl.[7] ........................... F16H 39/04; B64D 41/00
(52) U.S. Cl. .............................. 60/413; 60/453; 60/488; 244/58
(58) Field of Search ..................... 60/413, 453, 456, 60/464, 486, 488; 244/58, 60; 138/31

(56) References Cited

U.S. PATENT DOCUMENTS

| | | | |
|---|---|---|---|
| 2,239,566 A | | 12/1937 | Mercier |
| 2,556,719 A | | 4/1947 | Cushman |
| 3,328,555 A | | 8/1974 | Capdevielle |
| 4,403,629 A | * | 9/1983 | de Vries ........................ 138/31 |
| 4,895,192 A | | 1/1990 | Mortenson |
| 4,936,247 A | | 1/1990 | Sundstrom |
| 4,913,181 A | * | 4/1990 | Mortenson ................... 60/413 |
| 4,926,908 A | | 5/1990 | Dschida |
| 5,003,772 A | | 4/1991 | Huber |
| 4,953,663 A | * | 9/1999 | Sugden ....................... 184/6.12 |
| 6,006,776 A | * | 12/1999 | Dill ............................. 137/109 |

FOREIGN PATENT DOCUMENTS

DE          3728555 A1 *   3/1989

* cited by examiner

Primary Examiner—Edward K. Look
Assistant Examiner—Thomas E. Lazo
(74) Attorney, Agent, or Firm—Keith A. Newburry, Esq.

(57) ABSTRACT

The present invention meets these objectives providing an IDG hydraulic system that utilizes in flow series arrangement a scavenge pump, a spool valve and a boost pump. When spool valve detects an interruption in the supply pressure to the boost pump due to an adverse "g" condition, it reconfigures the system to a closed loop system. In this mode, the oil returning from the CVT is re-circulated back to the boost pump instead of back to the scavenge pump. Oil lost to leakage is replenished by an oil accumulator that use the gas pressure in the IDG's casing to expel fluid from the accumulator into the recirculating flow.

14 Claims, 4 Drawing Sheets

ACCUMULATOR UTILIZING HOUSING CASE PRESSURE

CROSS REFERENCE TO RELATED APPLICATION

This application is a continuation-in-part of copending U.S. patent application Ser. No. 09/482,212, filed on Jan. 12, 2000 which claims priority to provisional patent application Ser. No. 60/161,157 filed Oct. 22, 1999 which are incorporated herein by reference.

TECHNICAL FIELD

This invention relates generally to accumulators and in particular to an accumulator, used in an airborne, hydraulically operated integrated drive generator (IDG), for supplying hydraulic fluid during negative or zero "g" conditions.

BACKGROUND OF THE INVENTION

An integrated drive generator, (IDG), is an integral unit having a constant speed drive continuously variable transmission (CVT) and an electric generator in the same housing. The IDG converts variable speed rotary input from a shaft of an aircraft propulsion engine into a constant speed shaft drive which drives the electrical generator typically producing constant frequency three phase 400 Hz power. The transmission can be any of a plurality of continuously variable transmissions such as a hydrostatic pump/motor assembly, a traction drive, or pulley varidrive.

Referring to FIG. 1, a typical IDG 10 includes a pressurized casing 12 which acts as an oil sump by collecting hydraulic fluid 26 at its bottom. To maintain constant speed control of the CVT, oil from the sump is pumped to the CVT controls. In a negative "g" condition, the oil is forced from the bottom of the sump to the top and in a zero "g" condition the oil floats in the middle between the top and the bottom. Both these conditions are referred to as adverse "g" conditions and when either occurs, the oil quantity at the bottom of the sump drops and the flow to the CVT is interrupted. Such an interruption or drop in oil flow to the CVT will result in loss of speed control. This means that the CVT will be unable to hold a constant generator speed which will cause an automatic shut down of the IDG.

Commercial aircraft experience zero or negative "g" conditions under a variety of circumstances such as severe weather or emergency maneuvers. Clearly, when these circumstances occur it is important that the CVT continue to maintain constant generator speed, otherwise the aircraft will lose electric power. As a consequence, IDGs used on commercial aircraft are typically required to operate normally for a duration of 15 seconds of zero or negative "g" forces.

One method used to meet this 15 second requirement is to provide a second pump for pumping oil from the top of the sump when negative "g" is experienced. This method has had only limited success, because mounted in the sump are a plurality of rotating components which inhibit the flow of oil from the bottom to the top. Instead of the oil flowing smoothly to the top, it gets flung around the casing by these rotating components. Further, this method does not address the zero "g" conditions where oil tends to float in the middle of the sump.

Copending U.S. patent application Ser. No. 09/482,212, which is assigned to the assignee of this application, discloses an IDG hydraulic system that overcomes the disadvantages of the prior art systems by utilizing in flow series arrangement of a scavenge pump, a spool valve and a boost pump. When spool valve detects an interruption in the supply pressure to the boost pump due to an adverse "g" condition, it reconfigures the system to a closed loop system. In this mode, the oil returning from the CVT is re-circulated back to the boost pump instead of back to the scavenge pump. A small oil accumulator is used to make up for leakage in the system. Typically, these oil accumulators utilize a mechanical spring acting on a piston or a bladder acted upon by a charged gas volume. Both of these types of accumulators add cost and volume to the design.

Accordingly, there is a need for an improved piston type accumulator that does not require a spring or other mechanical actuator.

SUMMARY OF THE INVENTION

An object of the present invention is to provide a fluid accumulator for use in an hydraulic control system for an integrated drive generator having a constant speed drive variable transmission for providing hydraulic fluid during an adverse "g" event.

The present invention meets these objectives providing an IDG hydraulic system that utilizes in flow series arrangement of a scavenge pump, a spool valve and a boost pump. When spool valve detects an interruption in the supply pressure to the boost pump due to an adverse "g" condition, it reconfigures the system to a closed loop system. In this mode, the oil returning from the CVT is re-circulated back to the boost pump instead of back to the scavenge pump. Oil lost to leakage is replenished by an oil accumulator that uses the gas pressure in the IDG's casing to expel fluid from the accumulator into the recirculating flow.

These and other objects, features, and advantages of the present invention are specifically set forth in or will become apparent from the following detailed description of a preferred embodiment of the invention when read in conjunction with the accompanying drawings.

DESCRIPTION OF THE PREFERRED EMBODIMENT

Figure 1:
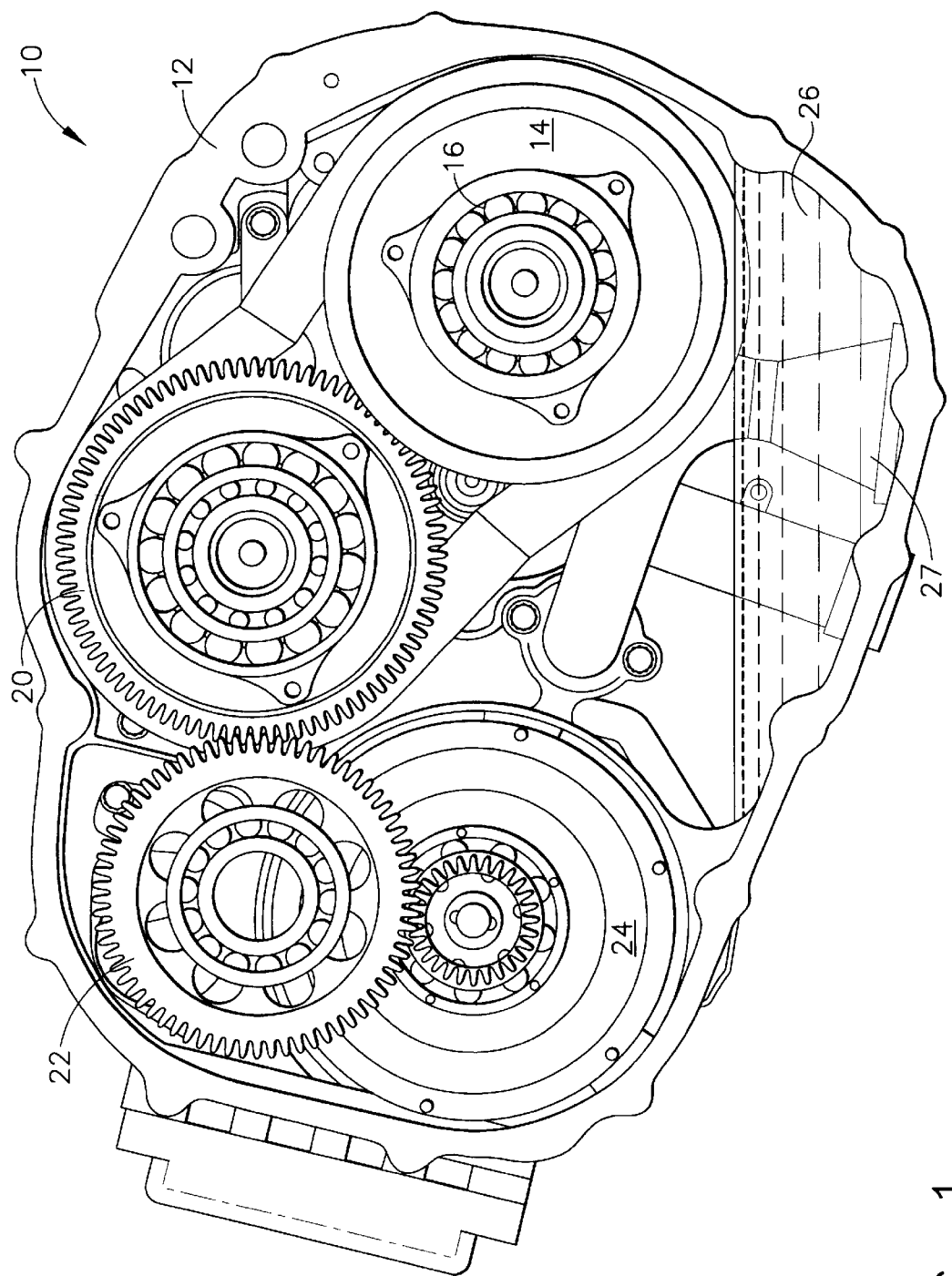
FIG. 1 is a cross section of an IDG of the type that can be used on an aircraft having the accumulator contemplated by the present invention.

Referring to FIG. 1, an integrated drive generator (IDG) is generally denoted by reference numeral 10. The IDG is comprised of a pressurized casing or housing 12. Mounted in the casing 12 is a CVT 14 having a input pad 16 that receives a variable speed input and an output gear 20 that drives an idler gear 22 and generator 24 at a constant speed of typically 12,000 or 24,000 rpm. The generator 24 is a conventional brushless generator that produces 400 Hz power. The casing 12 acts as the sump for the hydraulic fluid or oil that is used to control the CVT. During the normal operation the oil collects at the bottom of the casing as represented by area 26.

Figure 2:
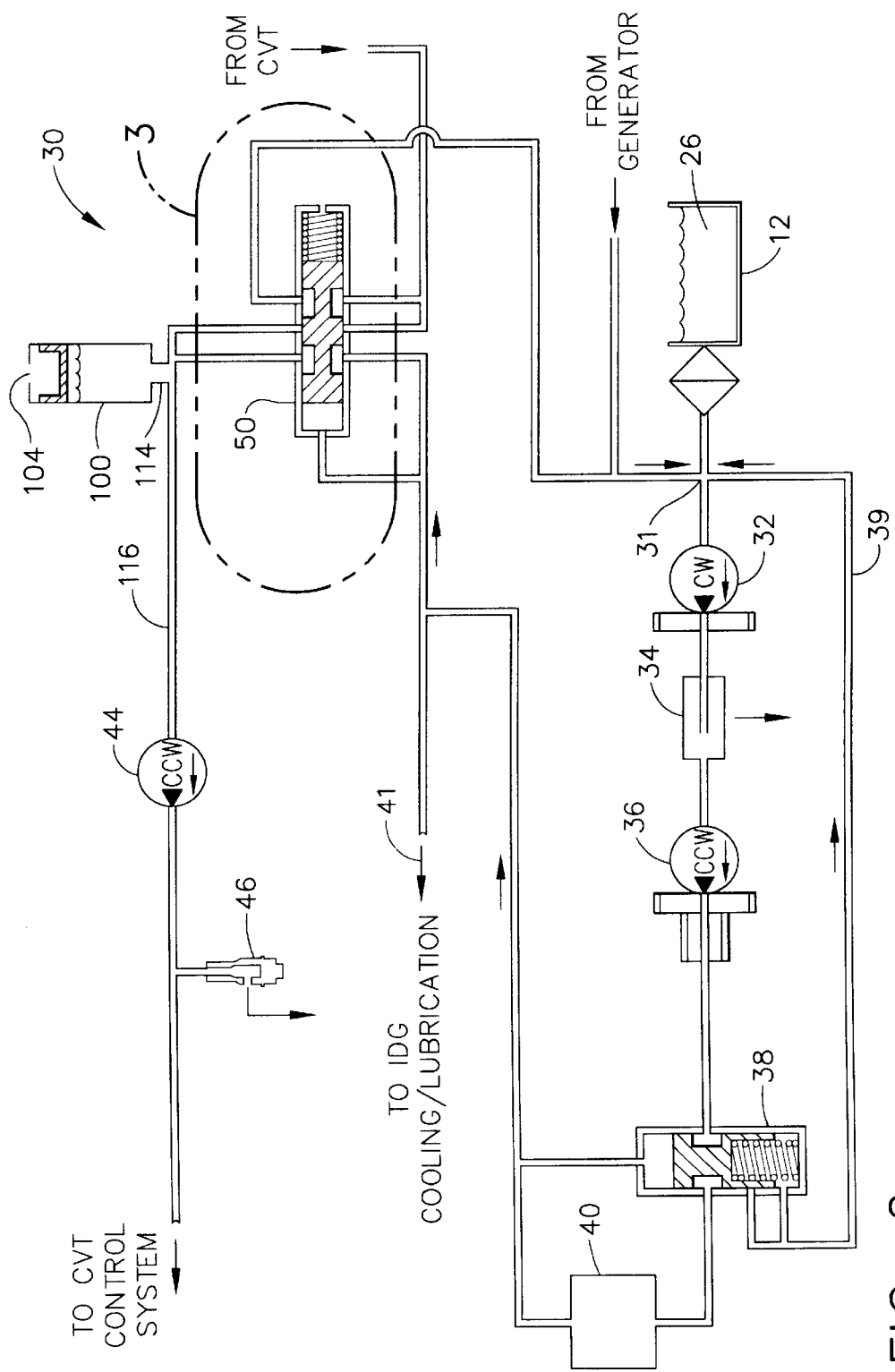
FIG. 2 is a schematic of the hydraulic system with the accumulator contemplated by the present invention.

Referring to FIG. 2, the flow of the hydraulic fluid to the IDG is managed by a hydraulic system 30. Oil is pumped through oil pickup 27 in the sump 12 by a scavenge pump 32 and then flowed to an air/oil separator 34 which, in a manner familiar to those skilled in the art, removes air from the fluid. From the air/oil separator, the oil flows to a supply pump 36 which pressurizes the oil. A pressure regulator 38 regulates the output of the supply pump to a preferable 65 psi (4.5 bar). A bypass 39 is provided to return bleed off flow from the regulator 38 back to the scavenge pump inlet. From the pressure regulator 38, the oil flows through an external heat exchanger 40 where the oil is cooled. From the heat exchanger 40 approximately 85% of the oil is flowed, as represented by arrow 41, to various parts of the IDG where it is used for cooling and/or lubrication. The remaining 15% flows to a spool valve 50.

Figure 3A:
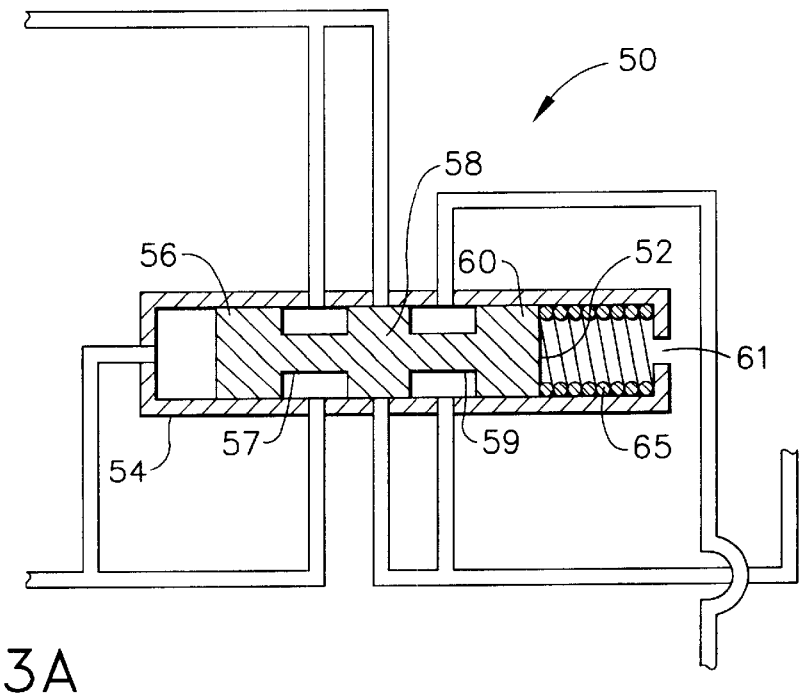
FIG. 3A is an enlarged view of the spool valve of the hydraulic system of FIG. 2 during normal, positive "g" operation.
Figure 3B:
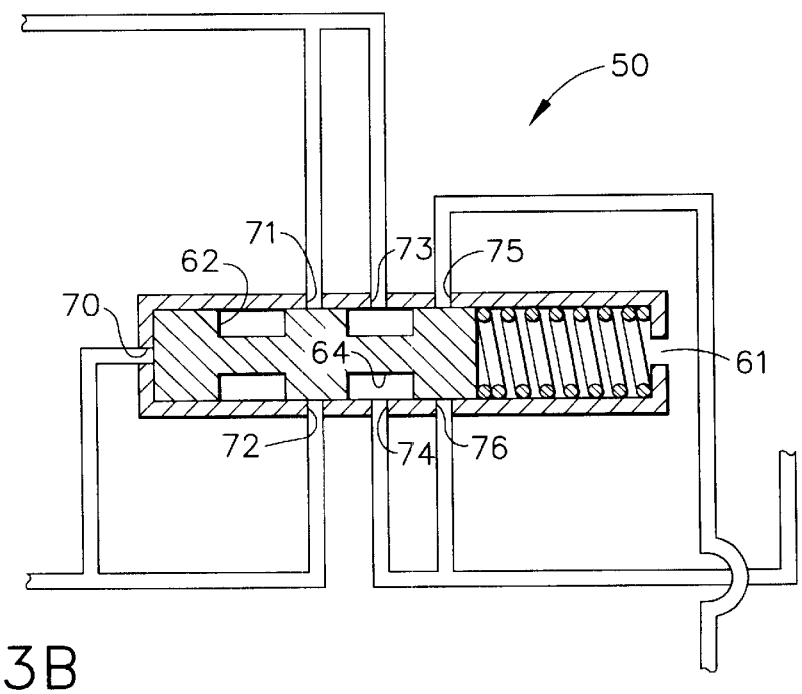
FIG. 3B is an enlarged view of the spool valve of the hydraulic system of FIG. 2 during adverse "g" operation.

Referring to FIGS. 3A and 3B, the spool valve 50 is a conventional spool valve having a piston 52 slideably mounted within a casing 54. The piston 52 is comprised of three block portions 56, 58, 60 connected by rod portions 57 and 59. The rod portions have a diameter less than the block portions and the block portions are sized to seal against the inner surface of the casing thereby defining chambers 62 and 64. The end of the block portion 56 is adjacent to a supply port 70 and the end of the block portion 60 is mounted against a spring 65 which is mounted within the casing 54. In addition to the supply port 70, the valve 50 has inlet ports 72, 74, 76 and outlet ports 71, 73, and 75. It also has a vent 61 through which any leakage flow around block portion 60 can escape. This vent 61 prevents leakage flow from being trapped which could inhibit the movement of the piston 52. Inlet port 72 and the supply port 70 receive the 15% flow from the heat exchanger 40 while inlet ports 74 and 76 receive the oil flow returning from the CVT. Outlet ports 71 and 73 communicate with a boost pump 44 which delivers pressurized oil to the CVT. Outlet port 75 communicates back to an intermediate point 31 between the scavenge pump 32 and the sump 12 where the return flow is added to the oil flow from the sump. Between the spool valve 50 and the intermediate point 31, the return flow from the generator 24 is added to the return flow from the CVT 14.

Referring to FIG. 3A, during normal operation the pressure at the supply port 70 is about 65psi which forces the piston 52 to the right against the spring. This places chamber 62 in fluid communication with inlet port 72 and outlet port 71 and places chamber 64 in fluid communication with inlet port 76 and outlet port 75. Oil from the heat exchanger 40 flows through the inlet port 72, outlet port 71 to boost pump 44 and then to the CVF 14. Oil returning from the CVT 14 flows through inlet port 76, outlet port 75 and then back to the intermediate point 31.

When an adverse "g" condition is encountered, see FIG. 3B, the oil is thrown away from the bottom of the casing 12. As there is no oil to be scavenged from the sump, the pressure at the supply port 70 drops to almost case ambient pressure so that the pressures on both sides of the piston 52 are nearly balanced. Looking at the figures, the spring 65 now pushes the piston 60 towards the left so that inlet ports 72 and 76 and outlet ports 71 and 75 are blocked by the piston 60 and inlet port 74 and outlet port 73 open and communicate through chamber 64. As a result, the oil returning from the CVT is re-circulated through the spool valve 50 back to the boost pump 44 which continues to supply the CVT with oil at an appropriate pressure.

Figure 4:
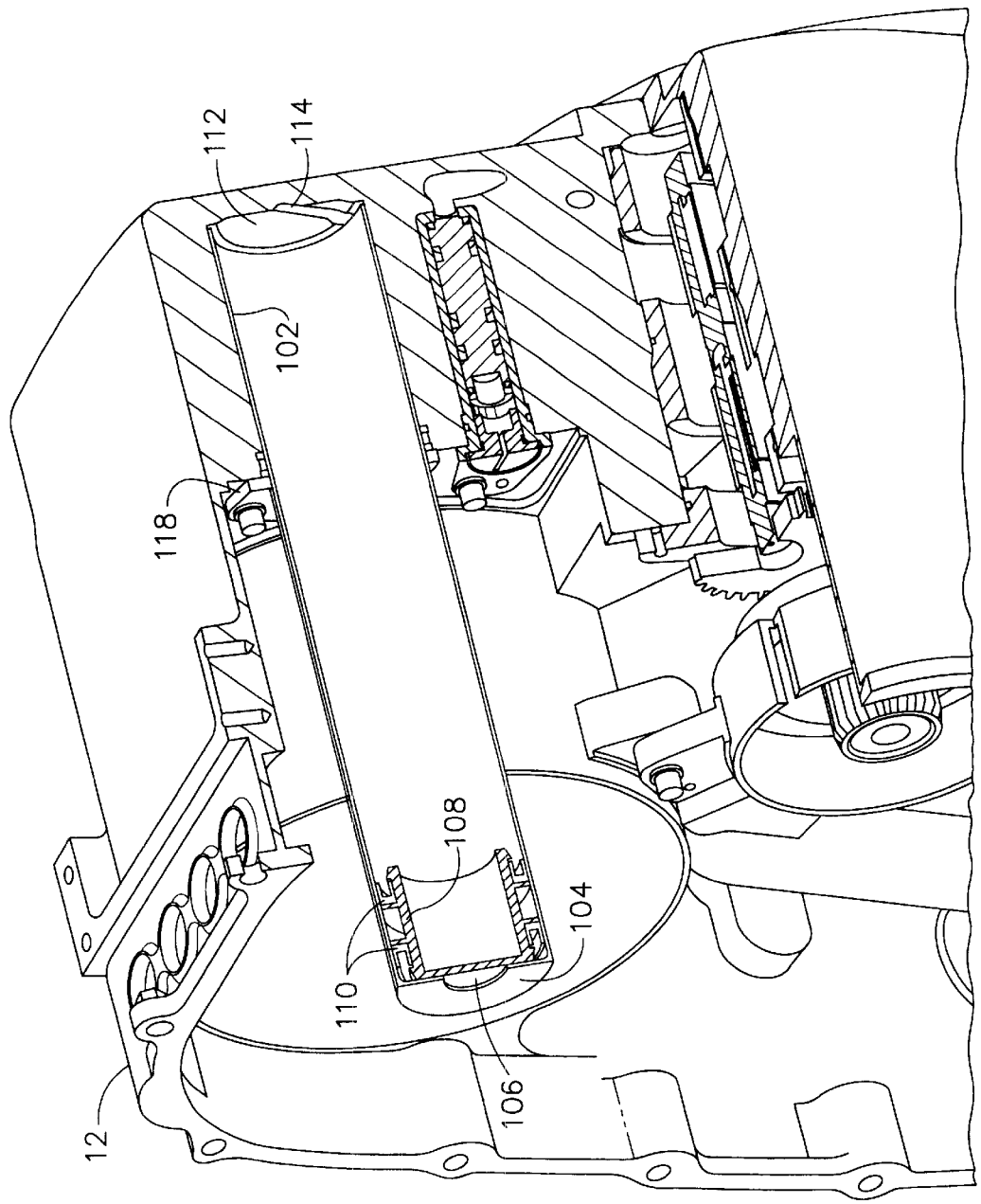
FIG. 4 is a cutaway, perspective view of the IDG having the accumulator contemplated by the present invention.

Because oil leaks from the CVT, an accumulator 100 is activated to maintain a sufficient flow of oil. Referring to FIGS. 2 and 4, the accumulator 100 comprises a cylindrical casing 102 extending from an air port 104 to an oil port 112. The air port 104 has a hole, also referred to as a vent, 106 which places the interior of the casing 102 in fluid communication with the interior of the casing 12. During the starting of the CVT, the air pressure within the casing 12 is about 14.7 psi (1.0 bar) at sea level and then increases due to the heating of the air within the casing 12 and is maintained throughout the operating envelope of the CVT by appropriate sealing of the casing. Disposed within the casing 102 is a piston 108 that is slidably mounted within the casing 102 on low friction seals 110. A passage 114 places the interior of the casing 102 with a conduit 116, shown in FIG. 2, extending from the spool valve 50 to the boost pump 44. The accumulator 100 is mounted in the internal structure of the casing 12 by an annular retaining plate 118. The plate 118 is mounted around the casing 102 and bolted to the internal structure of the casing 12. In the preferred embodiment, two low friction seals are used. Alternatively, the piston can be replaced with a diaphragm or bladder.

During normal operation of the CVT, the oil pressure in the conduit 116 is greater than the air pressure in the casing 12. As a result, the piston 108 is pushed toward the air port 104 expelling the air in the cylindrical casing 102 and replacing it with oil flowing through oil port 112 and passage 114. When an adverse "g" event occurs, the oil pressure in the conduit 116 drops below the air pressure in the casing 12 and the piston is pushed away from the air port 104 to the oil port 112 forcing the stored oil out through the passage 114 and to the conduit 116. This out flow of oil from the accumulator 100 is also assisted by a suction created by the boost pump 44. The duration for which this system 30 can operate depends on the size of the accumulator 100.

Once normal operation returns, pressure in the conduit rises and the piston 60 moves to the right until its return to its original position. At this time, the accumulator 100 is recharged.

Although the invention has been described in terms of an IDG used on an aircraft, it will be appreciated by those skilled in the art that the invention can be used for any hydraulically controlled mechanical system that may experience adverse "g" conditions. Accordingly, various changes and modifications may be made to the illustrative embodiment without departing from the spirit or scope of the invention. It is intended that the scope of the invention not be limited in any way to the illustrative embodiment shown and described, but that the invention be limited only by the claims appended hereto.

What is claimed is:

1. A hydraulic control system for an integrated drive generator having a constant speed drive variable transmission for maintaining oil pressure to the transmission during an adverse "g" event, comprising:

a gas filled pressurized casing having an oil sump;

a scavenge pump for suctioning oil from said sump;

a boost pump for pumping a portion of the oil from the scavenge pump to the transmission; and an oil accumulator mounted in said casing and having a first port in fluid communication with the interior of said pressurized casing and a second port in fluid communication with a conduit extending from said scavenge pump to said boost pump.

2. The system of claim 1 wherein said accumulator comprises a piston slidably mounted within a cylindrical casing, said piston moveable in response to the difference between the gas pressure in said casing and the oil pressure in said conduit.

3. The system of claim 2 further comprising a spool valve disposed upstream of said accumulator and between said scavenge pump and said boost pump, and further between a fluid return from said transmission and said scavenge pump, said spool valve operable in a first position where said portion of oil from said scavenge pump flows through said valve to said boost pump and said return flow from said transmission flows through said valve to said scavenge pump and a second position where return flow from said transmission is re-circulated through said spool valve back to said boost pump.

4. The system of claim 3 wherein said piston moves from said first port to said second port when said spool valve is in said second position and moves from said second port to said first port when said spool valve is in said first position.

5. The system of claim 4 wherein said spool valve moves from said first position to said second position in response to a drop in oil pressure in said sump.

6. The system of claim 4 wherein said spool valve moves from said second position to said first position in response to a rise in oil pressure.

7. The system of claim 3 further comprising a pressure regulator disposed between said scavenge pump and said spool valve for maintaining a constant oil pressure to said spool valve when said spool valve is in said first position.

8. The system of claim 7 further comprising a heat exchanger disposed between said pressure regulator and said spool valve.

9. The system of claim 8 further comprising an air/oil separator disposed between said scavenge pump and said pressure regulator.

10. The system of claim 9 further comprising a supply pump disposed between said pressure regulator and said air/oil separator.

11. The system of claim 10 further comprising a bypass for flowing a second portion of said oil from said pressure regulator back to the inlet of said scavenge pump.

12. A method for providing hydraulic fluid to an integrated drive generator having a constant speed drive variable transmission mounted in a pressurized casing comprising the steps of:
 (a) during normal "g" conditions pumping said fluid from a sump to said transmission and returning said fluid from said transmission to mix with the fluid from said sump;
 (b) sensing an adverse "g" condition and in response thereto cease pumping from said sump and re-circulating the fluid returning from said transmission back to said transmission;
 (c) adding additional fluid to said re-circulating fluid by deplenishing a piston type accumulator mounted to said casing, said piston moveable in response to the difference between the gas pressure in said casing and the pressure of said re-circulating fluid;
 (d) sensing when said "g" conditions have returned to normal and in response thereto cease re-circulating said return fluid and resume pumping fluid from said sump; and
 (e) recharging said accumulator.

13. A hydraulic control system for an integrated drive generator having a constant speed drive variable transmission for maintaining oil pressure to the transmission during an adverse "g" event, comprising:
 a gas filled pressurized casing having an oil sump;
 a scavenge pump for suctioning oil from said sump;
 a boost pump for pumping a portion of the oil from the scavenge pump to the transmission;
 an oil accumulator mounted in said casing and having a first port in fluid communication with the interior of said pressurized casing and a second port in fluid communication with a conduit extending from said scavenge pump to said boost pump;
 a spool valve disposed upstream of said accumulator and between said scavenge pump and said boost pump, and further between a fluid return from said transmission and said scavenge pump, said spool valve operable in a first position where said portion of oil from said scavenge pump flows through said valve to said boost pump and said valve to said boost pump and said return flow from said transmission flows through said valve to said scavenge pump and a second position where return flow from said transmission is re-circulated through said spool valve back to said boost pump; and
 a pressure regulator disposed between said scavenge pump and said spool valve for maintaining a constant oil pressure to said spool valve when said spool valve is in said first position,
 wherein said accumulator comprises a piston slidably mounted within a cylindrical casing, said piston moveable in response to the difference between the gas pressure in said casing and the oil pressure in said conduit, and
 wherein said piston moves from said first port to said second port when said spool valve is in said second position and moves from said second port to said first port when said spool valve is in said first position.

14. A fluid accumulator for use with a pressurized casing comprising:
 a cylindrical casing extending from a first port to a second port and mounted in said pressurized casing, the interior of said cylindrical casing in fluid communication with the interior of said pressurized casing through a hole in said first port;
 a fluid passage connecting said second port with a flow of said fluid;
 a piston mounted on at least one low friction seal and slidably mounted within said cylindrical casing and moveable between said first and second ports in response to the difference in pressure between the air in said pressurized casing and said fluid flow; and
 an annular retaining plate mounted around the cylindrical casing and attached to an internal structure of said pressurized casing.

* * * * *